United States Patent [19]
Jarmuz

[11] Patent Number: 5,631,770
[45] Date of Patent: May 20, 1997

[54] REFLECTIVE SCANNING TELESCOPIC SYSTEM ON SINGLE OPTICAL BENCH

[75] Inventor: Paul J. Jarmuz, Nashua, N.H.

[73] Assignee: Hughes Danbury Optical Systems, Inc., Danbury, Conn.

[21] Appl. No.: 249,872

[22] Filed: May 26, 1994

[51] Int. Cl.$^6$ .............................. G02B 5/08; G02B 5/10; G02B 17/00
[52] U.S. Cl. .......................... 359/351; 359/366; 359/731; 359/732; 359/859; 359/861; 359/900
[58] Field of Search .......................... 359/351, 364, 359/365, 366, 727, 728, 729, 730, 731, 732, 858, 859, 861, 900

[56] References Cited

U.S. PATENT DOCUMENTS

| | | | |
|---|---|---|---|
| 3,454,338 | 7/1969 | Girard et al. | 359/859 |
| 3,674,334 | 7/1972 | Offner. | |
| 3,827,778 | 8/1974 | Wheeler | 359/365 |
| 4,101,195 | 7/1978 | Korsch | 350/55 |
| 4,205,902 | 6/1980 | Shafer | 359/859 |
| 4,655,592 | 4/1987 | Allemand | 359/859 |
| 5,136,422 | 8/1992 | Ukon | 359/366 |
| 5,239,404 | 8/1993 | McLaughlin et al. | 359/226 |
| 5,386,316 | 1/1995 | Cook | 359/861 |

Primary Examiner—Ricky D. Shafer
Attorney, Agent, or Firm—W. C. Schubert; W. K. Denson-Low

[57] ABSTRACT

A reflective scanning telescopic system comprises: a primary ellipsoidal mirror for collecting incoming light, a secondary hyperbolic mirror for reflecting the light collected by the primary mirror axially through the primary mirror, a tertiary ellipsoidal mirror, disposed behind the primary mirror for receiving the light from the secondary curved mirror, and a double bounce fold mirror for directing light reflected from the first fold mirror to the tertiary mirror and for reflecting light from the tertiary mirror past the first fold mirror to a light imaging system. Ideally, the telescopic system is mounted on a substantially rigid optical bench on a gimbal for supporting the optical bench and enabling the optical bench to scan in two dimensions by pivoting along roll and pitch axes.

10 Claims, 8 Drawing Sheets

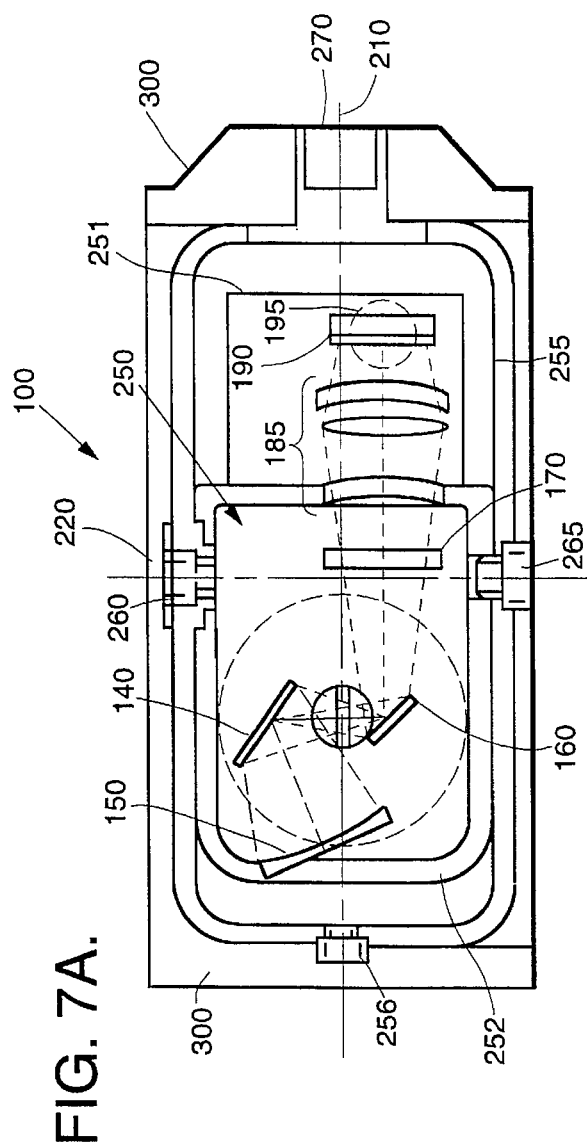
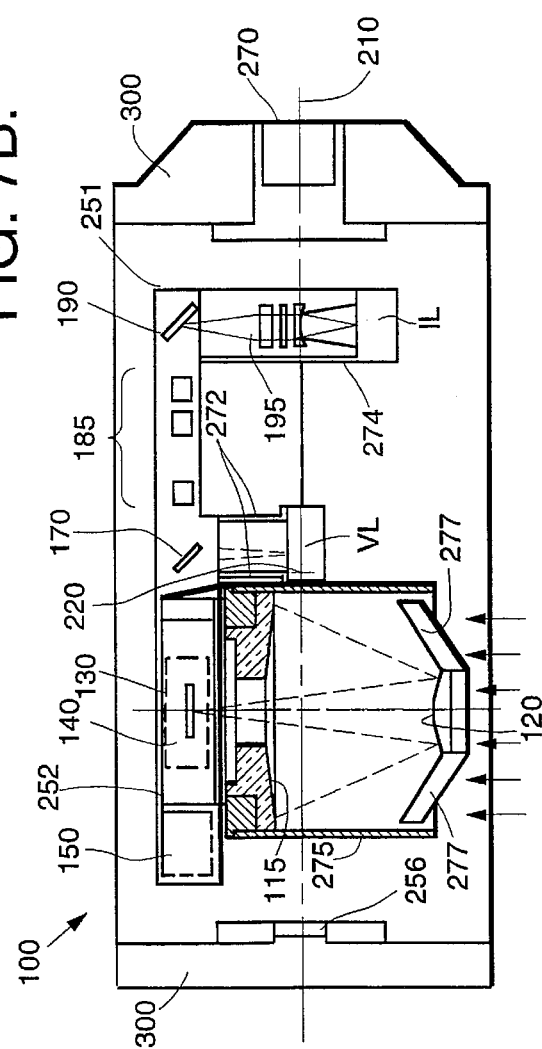
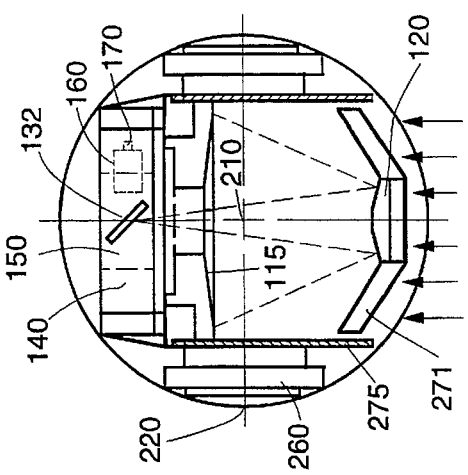
FIG. 7A.
FIG. 7B.
FIG. 7C

REFLECTIVE SCANNING TELESCOPIC SYSTEM ON SINGLE OPTICAL BENCH

BACKGROUND OF THE INVENTION

The best known applications for compact scanning telescopic systems are military in nature. In these applications, the scanning telescope is positioned to look down from the underside of an aircraft's nose. From this position, the telescope can scan the terrain over which the aircraft is passing to find potential targets using both the visible and infrared spectrums. Outside of the obvious military applications, there are other applications in ecology and farming. For example, the look-down scanning telescopic systems are useful in identifying diseased trees or crops. Further, infrared and visible light scanning can be effective in finding missing persons in search and rescue operations.

In each of these applications, the design requirements for the scanning telescope are essentially similar. That is, the scanning telescope must be compact and lightweight so that it does not impair the performance of the airplane in which it is mounted. Further, since in many applications, the scanning telescope will be placed in the nose of the aircraft, the width of the system should be minimized in favor of length. Additionally, the telescope should be mechanically robust to withstand the vibrations found on aircraft.

SUMMARY OF THE INVENTION

The present invention disclosed and claimed in this application concerns a reflective scanning telescopic system, which comprises: a primary curved mirror for collecting incoming light, a secondary curved mirror for reflecting the light collected by the primary mirror axially through the primary mirror, and a tertiary curved mirror, disposed behind the primary mirror for receiving the light from the secondary curved mirror. The system further incorporates a first fold mirror positioned behind the primary mirror and in front of the secondary mirror to direct light reflected by the secondary mirror towards the tertiary mirror and a double bounce fold mirror for directing light reflected from the first fold mirror to the tertiary mirror and for reflecting light from the tertiary mirror past the first fold mirror to a light imaging system.

In a specific embodiment of the invention, the primary curved mirror has an ellipsoidal curvature, the secondary curved mirror has an hyperbolic curvature, and the tertiary curved mirror has an ellipsoidal curvature.

In a different characterization of the invention, the reflective scanning telescopic system comprises: a substantially rigid optical bench pivotable around a roll axis and pivotable around a pitch axis, a primary curved mirror, mounted to the optical bench, for collecting incoming light, a secondary curved mirror, positioned in front of the primary mirror and mounted to the optical bench, for reflecting light from the primary mirror, and a tertiary curved mirror, mounted to the optical bench, for reflecting light from the secondary mirror. A first fold mirror is also positioned behind the primary mirror and in front of the secondary mirror to direct light reflected by the secondary mirror towards the tertiary mirror. The first fold mirror is a strip mirror for picking off a field angle of the light from the secondary mirror.

The invention may further include a gimbal for supporting the optical bench and enabling the optical bench to scan in two dimensions by pivoting along the roll axis and the pitch axis.

The above and other features of the invention including various novel details of construction and combinations of parts will now be more particularly described with reference to the accompanying drawings and pointed out in claims. It will be understood that the particular scanning telescopic system embodying the invention is shown by way of illustration and not as a limitation of the invention. The principles and features of this invention may be employed in varied and numerous embodiments without departing from the invention's scope.

BRIEF DESCRIPTION OF THE DRAWINGS

FIGS. 7a, 7b, and 7c are top, side cross-sectional and end cross-sectional views respectively of the inventive system mounted with a gimbal to an aircraft superstructure;

DETAILED DESCRIPTION OF THE PREFERRED EMBODIMENT

Figure 1:
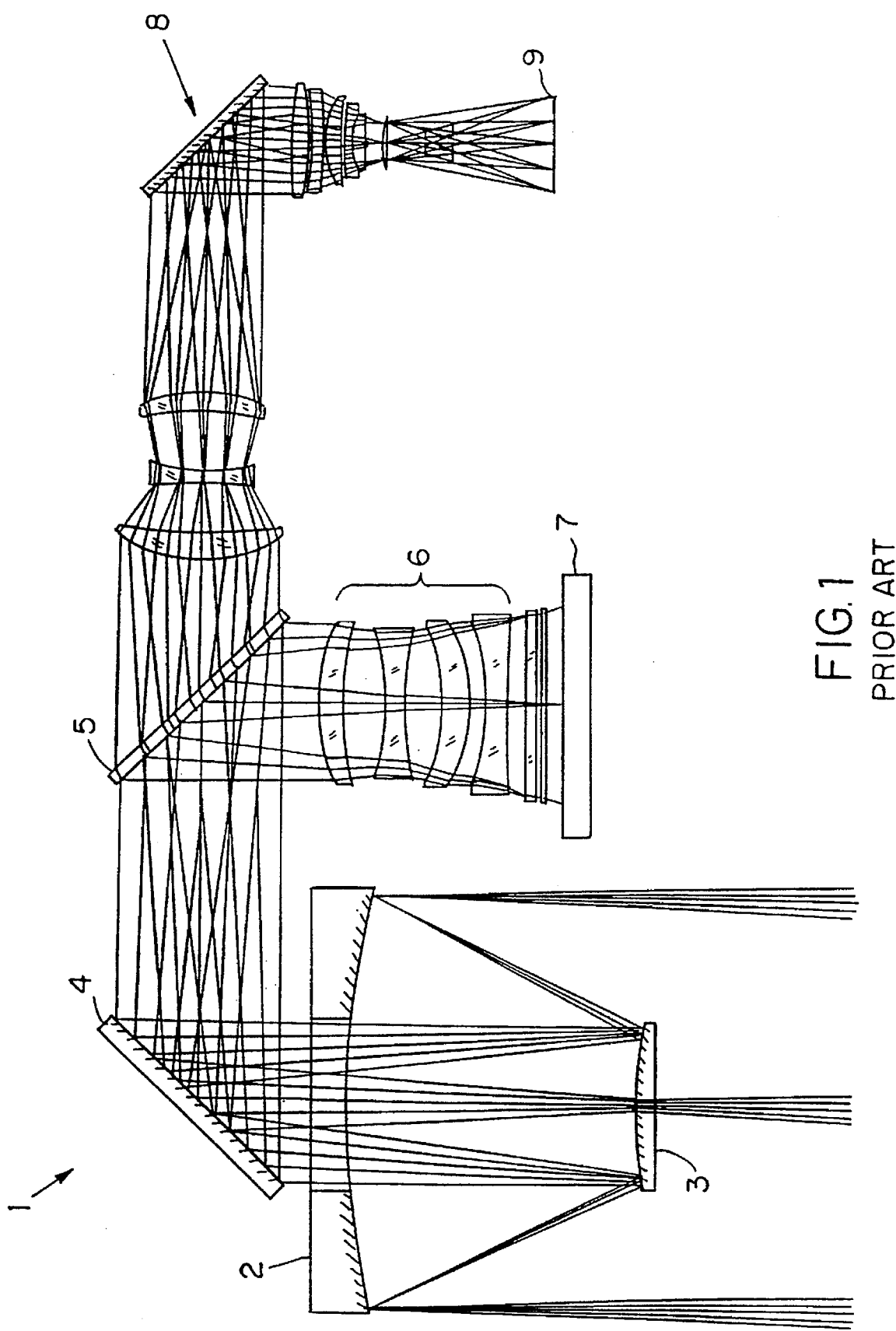
FIG. 1 is a side cross-sectional view of a prior art Cassegrain design telescopic system.

Turning now to the figures, a prior art Cassegrain visible and infrared light telescope 1 is shown in FIG. 1. Specifically, incoming light is collected by a primary mirror 2 and reflected to a secondary mirror 3. This secondary mirror then reflects the light axially through the primary mirror to a first fold mirror 4. The fold mirror directs the light longitudinally down the telescope to a beamsplitter 5, which divides the light between a visible light imaging system and an infrared light imaging system. The light received by both the visible and infrared light imaging systems has a curved and astigmatic field due to the primary and secondary mirrors 2, 3. In the visible light imaging system, a visible light refractive optics group 6 is provided to flatten the field and correct for the astigmatism. After this correction, the light is imaged on the linear charged coupled device (CCD) array 7. Similarly, in the infrared light imaging system 8, the received light is folded by the second fold mirror vertically down the telescope and then the field is flattened and the astigmatism is corrected by the infrared refractive optics group.

The traditional Cassegrain configuration has a number of advantages. First, its layout is generally longitudinal, i.e., its width is no wider than the diameter of the primary mirror, since the first fold mirror directs the light longitudinally along the telescope to the visible and infrared light imaging systems. Further, the primary mirror 2, secondary mirror 3, first fold mirror 4, beamsplitter 5, and the visible and infrared light imaging systems can all be mounted on the same rigid optical bench. This feature is of particular advantage since these telescopes are usually mounted on gimbals so that the telescopes can scan or track in two dimensions. Therefore, the physical relationship between the optics can be precisely maintained while the entire system is undergoing the accelerations associated with scanning operations.

The principle drawback associated with the traditional Cassegrain configuration lies in the optical light imaging system. The refractive optics utilized to correct astigmatism and flatten the field are spectrally limited to light within the ranges of 500 nm to 950 nm and have chromatic aberrations within this range. Moreover, controlling the surface curvature of refractive optics during manufacture places certain limitation on the precision to which any astigmatism or field flattening can be achieved since the curvature of two surfaces must be precisely controlled. Still further, refractive optics have size and material limitations and lack radiation hardness.

Figure 2:
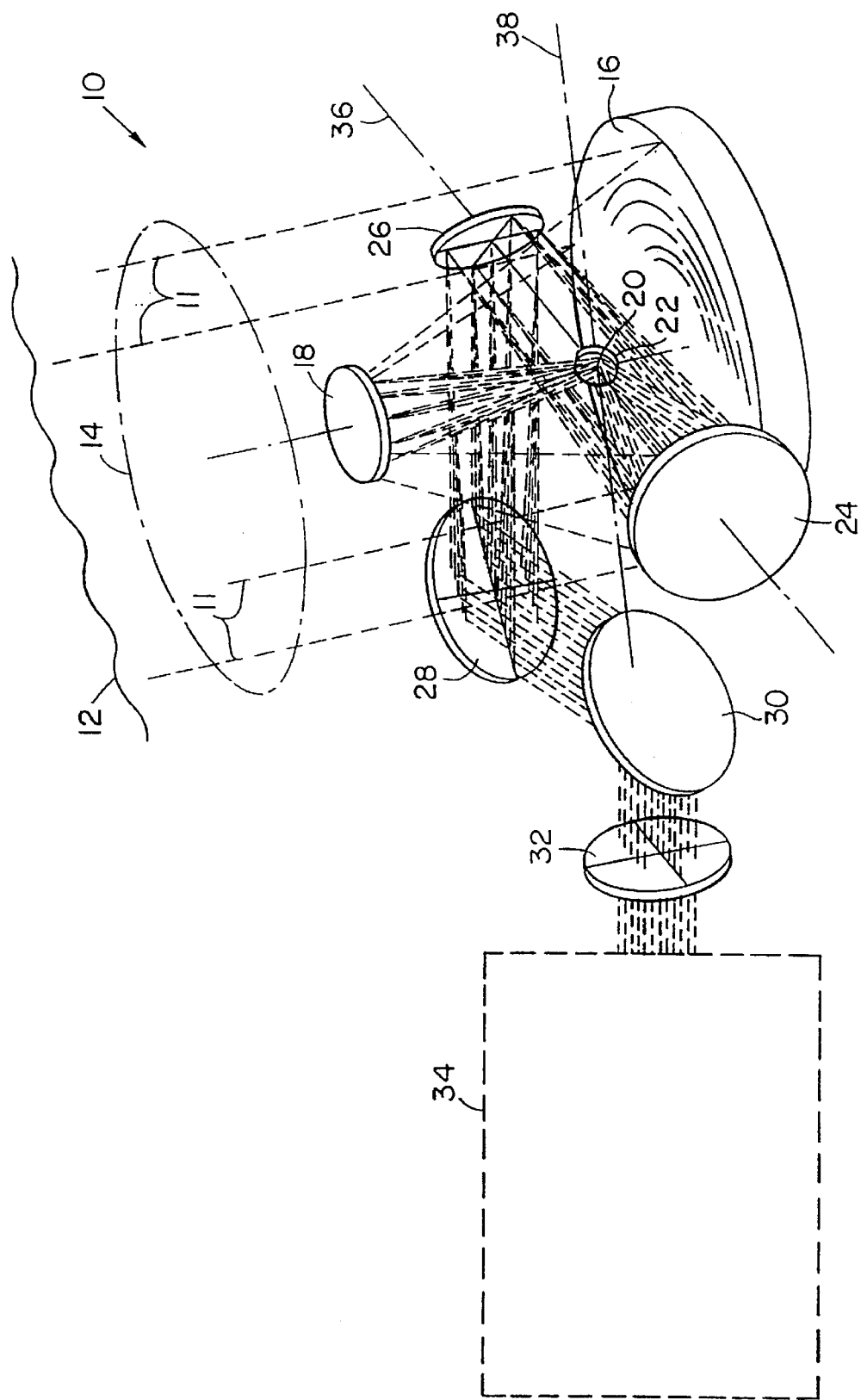
FIG. 2 is a perspective view of a conventional reflective scanning telescope.

One solution to achieving a flat extended field and astigmatism correction over a broader spectral range than the traditional Cassegrain design is illustrated in FIG. 2 and first disclosed in U.S. Pat. No. 5,239,404. In this invention, light 11 from a scene 12 enters the system 10 through entrance aperture 14. The light impinges on primary mirror 16 and is reflected to secondary mirror 18. Both the primary mirror 16 and secondary mirror 18 are curved to direct the light from the secondary mirror 18 toward a focus located at point 20. A fold mirror 22 reflects the light toward a tertiary mirror 24. The tertiary mirror 24 reflects the light along an axis back toward three plane fold mirrors 26, 28, 30. The light is reflected by the three fold mirrors 26, 28, 30 in succession along a path to an exit aperture 32. The light leaves the device 10 through the exit aperture 32 and is detected by optical detection apparatus 34. The system 10 is pivotable about a pitch axis 36 and a roll axis 38. When scanning a scene 12, rotation about both of these axes 36, 38 is simultaneously controlled.

The light from secondary mirror 18 is reflected by the fold mirror 22 along the pitch axis 36 toward tertiary mirror 24. Tertiary mirror 24 reflects the light back along the pitch axis 36 to the plane fold mirror 26. When the system 10 is rotated about the pitch axis 36, mirrors 16, 18 and 22 rotate as a unit in a fixed relation to each other. Mirrors 24, 26, 28, and 30 remain stationary with respect to mirrors 16, 18, and 22. Thus, the light leaving third mirror 22 will continue to impinge on tertiary mirror 24 and will be directed by mirrors 26, 28, 30 to exit aperture 32 and on to the detection apparatus 34. When the system 10 is rotated about the roll axis 38, all of the mirrors 16, 18, 22, 24, 26, 28, and 30 rotate as a unit in fixed relation to each other. As a result, regardless of the orientation of the system about the roll axis 38, light is directed through the system 10 to the exit aperture 32.

Although achieving a broad spectral response, the invention of FIG. 2 has certain drawbacks for particular applications. First, the fact that mirrors 16, 18, and 22 are not in a fixed relationship with mirrors 24, 26, 28 and 22 can present alignment problems and require complex mechanical support structures. Further, maintaining proper alignment between the system 10 and the optical detection apparatus 34 can also be a problem. Therefore, although greatly increasing the spectral response by avoiding the use of refractive optics, this invention configuration raises new challenges associated with mirror alignment and complexity in the seven independent mirrors 16, 18, 22, 24, 26, 28 and 30.

Figure 3:
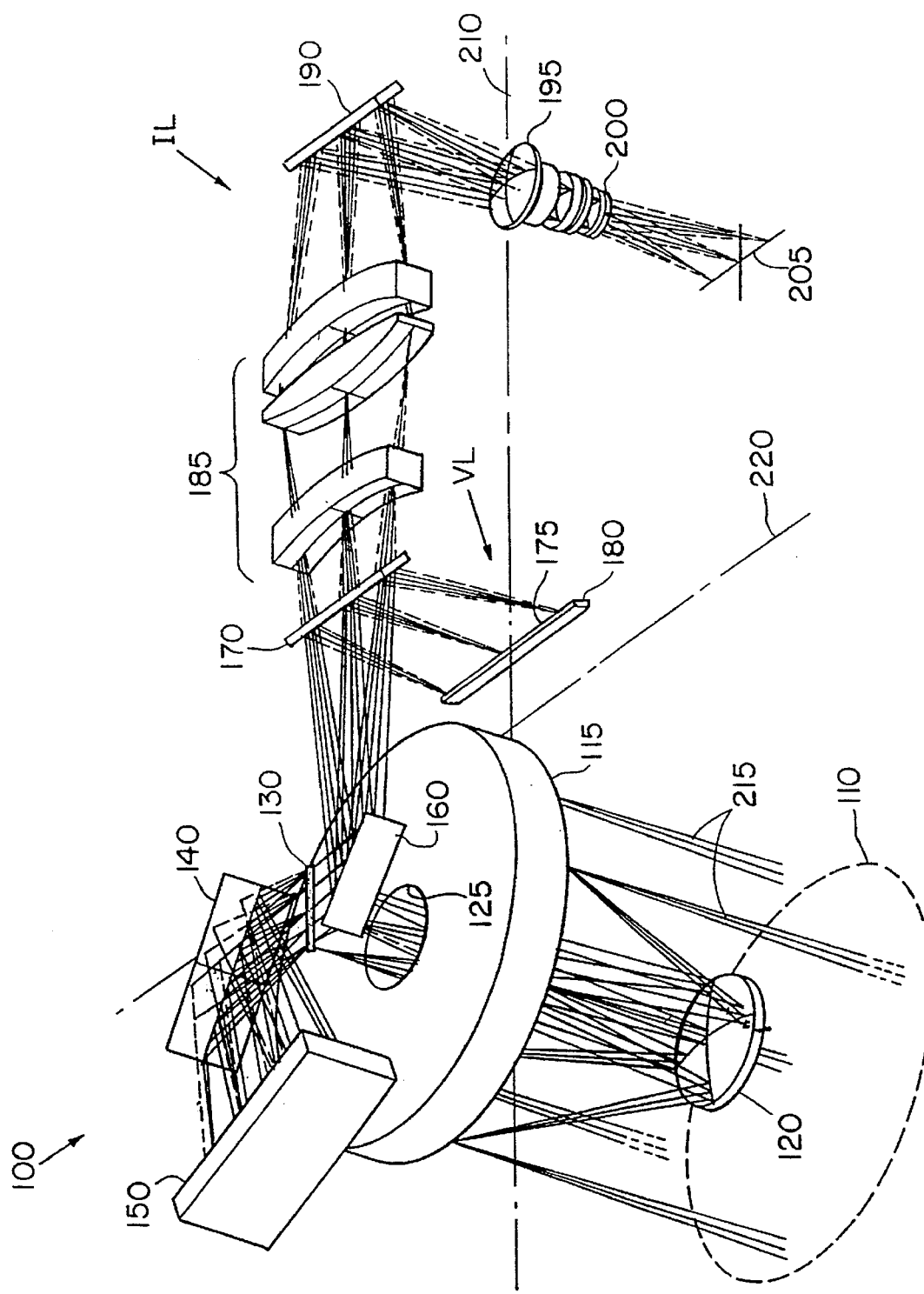
FIG. 3 is a perspective view of the inventive reflective scanning telescopic system panning configuration.

FIG. 3 is a perspective view of a reflective scanning telescopic system 100, panning configuration, constructed according to the principles of the present invention. As shown by this figure, an ellipsoidal primary mirror 115 collects incoming light 215 received through an entrance aperture 110 and causes the light to converge toward a hyperbolic secondary mirror 120, which is positioned in front of the primary mirror 115. Light reflecting off the secondary mirror 120 travels axially through a central aperture 125 formed in the primary mirror 115. A strip fold mirror 130, located behind the primary mirror 115, picks off field angles by redirecting the light from the secondary mirror substantially parallel to a pitch axis 220 of the telescopic system 100. A double bounce fold mirror 140 then redirects the light generally longitudinally along the telescopic system to an ellipsoidal tertiary mirror 150. This tertiary mirror 150 both corrects for any astigmatisms in the primary and secondary mirrors 115, 120 and also flattens the field of the light so that it can later form a planar image at a focal plane 175.

The light from the tertiary mirror 150 is directed back to the double bounce fold mirror 140 and laterally past the strip fold mirror 130 to a first single bounce fold mirror 160 where the light is directed longitudinally and parallel to the roll axis 210. The light from the first single bounce fold mirror 160 is then divided between a visible light imaging system VL and an infrared light imaging system IL by a beamsplitter 170. A charge coupled device 180 is positioned below the beamsplitter 170 on the visible light focal plane 175 so that the light can be converted into an electrical signal. Since the image plane of the light has already been flattened, the visible light imaging system VL need only contain charge couple device 180, i.e., no refractive optics are required.

The infrared light imaging system IL includes an infrared field group 185 for adjusting the beam width of the light from the beamsplitter 170 and also the focal length. In contrast to the visible light imaging system, the infrared light imaging system IL does include refractive optics. Here, however, their use has fewer detrimental effects. Fewer of the wavelengths of interest are absorbed by the refractive material. And, since infrared light has a five times longer wavelength than most of the visible light, the precision to which the infrared field group needs to be ground is substantially relaxed. The infrared light imaging system IL further includes a second single bounce fold mirror 190 for directing the light from the infrared field group 185 downward to an infrared relay 195, a cold stop 200, and finally the infrared focal plane 205.

Figure 4:
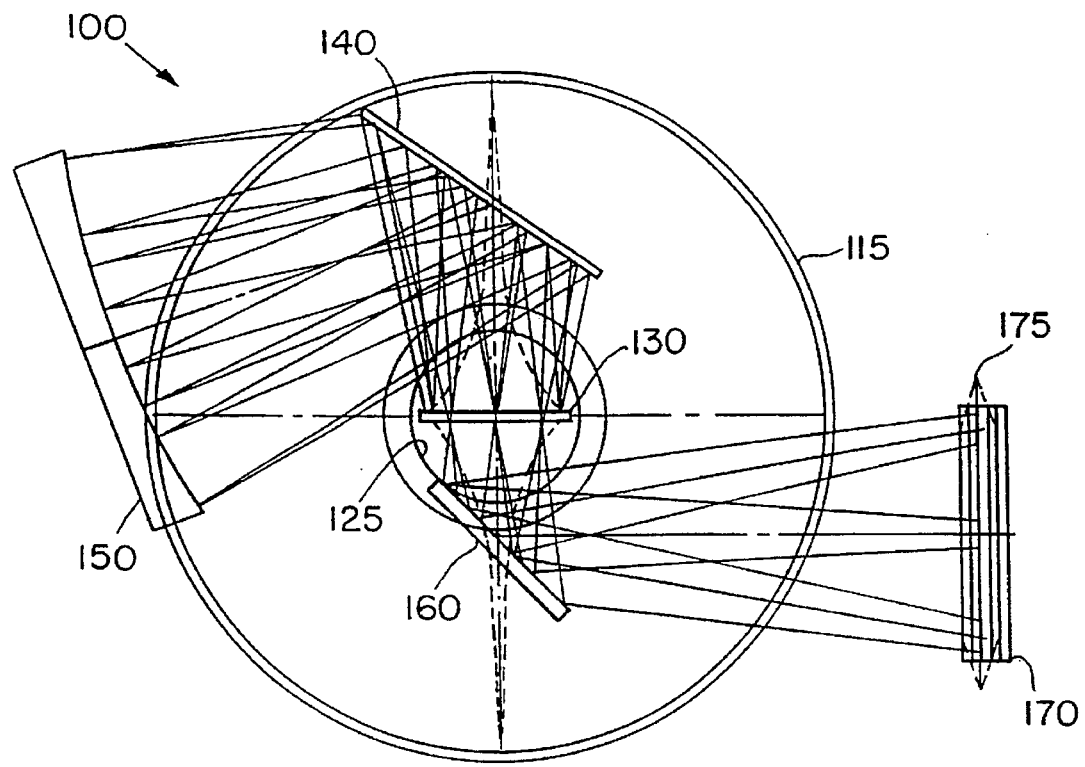
FIG. 4 is a top view of the inventive reflective scanning telescopic system.

FIG. 4 is a top view of the scanning configuration 100 showing the ray traces of the light between the strip mirror 130, the double bounce fold mirror 140, the tertiary mirror 150, and the first single bounce fold mirror 160.

Figure 5:
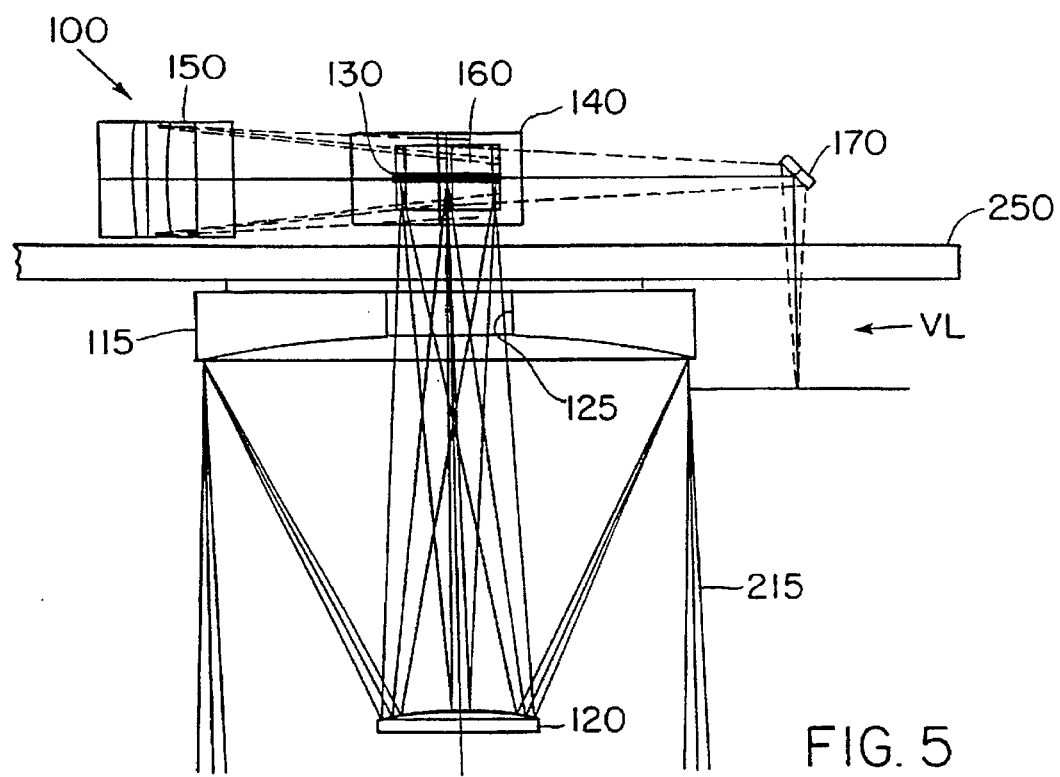
FIG. 5 is a partial side cross-sectional view of the inventive system.

FIG. 5 is a partial side view of the panning configuration 100 illustrating the relationship between the mirrors and the single rigid optical bench 250 on which they are mounted. As shown this figure, the primary mirror 115 is mounted off of the bottom of the optical bench 250 so that light from the secondary mirror 120 is directed axially through the primary mirror 115 and through the optical bench 250. On the top side of the optical bench 250, the strip fold mirror 130 mounted to the bench 250 redirects the light parallel to the top surface of the optical bench 250 to the double bounce fold mirror 140, tertiary mirror 150, first single bounce fold mirror 160 and the beamsplitter 170 also mounted to the bench 250 to yield a compact and rigid configuration. The actual connecting elements have been left out for clarity in this figure.

Figure 6:
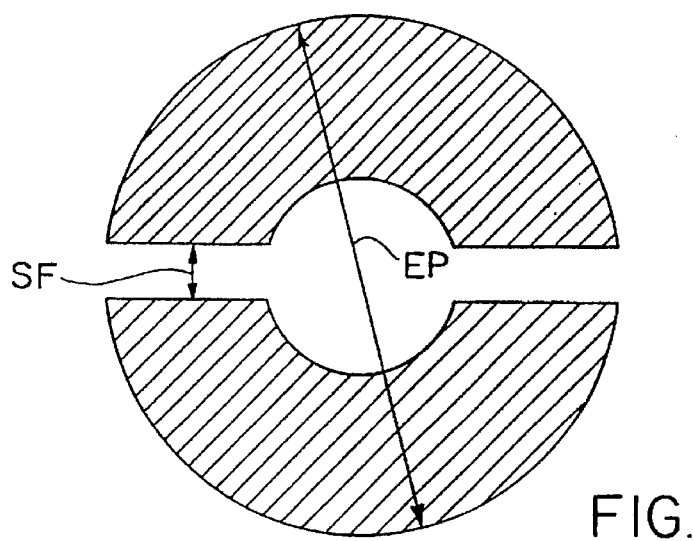
FIG. 6 shows the entrance pupil and the loss of aperture caused by a strip fold mirror.

FIG. 6 illustrates the entrance pupil and the effect of the strip fold mirror 130. That is, when the light travels between the double bounce fold mirror 140 and the first single bounce fold mirror 160, the strip fold mirror 130 carves out a portion SF of the entrance pupil EP, thus sending some of the light originally collected by the primary mirror 150 back out of the telescopic system. The strip mirror represents a blockage in aperture but not in field since the focal point is at the focal plane 175. Also, the design minimizes the blockage of the strip fold mirror 130 by allowing the beam to expand after the strip fold mirror so that the size of the strip fold mirror is negligible compared to the beam size between the double bound fold 140 and the first single bound fold 160. This effect is further minimized by positioning the strip fold mirror 130 at or near the focal point of the primary and secondary mirrors 115, 120 thereby enabling minimization of the strip fold mirror's size. This being said, however, the strip fold mirror should not be placed precisely at the focal point since any surface defects on it will destroy an entire portion of any image.

Generally, the telescopic system 100, panning configuration, is pivotally attached to an aircraft superstructure 300 so that it can be panned in two dimensions. FIGS. 7a, 7b, and 7c illustrate the telescopic system 100 gimballed on an aircraft. More specifically, a roll cage 255 is pivotally mounted to the superstructure 300 to rotate around the roll axis 210. A roll motor 270 drives the roll cage 255 to rotate around the roll axis on roll bearing 256. The optical bench 250 is then pivotally attached to the roll cage 255 to pivot along the pitch axis 220. That is, a pitch motor 260 and a pitch bearing 265 connected to the roll cage 255 support and rotate the optical bench 250.

The optical bench 250 comprises a fore portion 252 and an aft portion 251. The fore portion 252 generally supports the primary mirror 115, the secondary mirror 220, the strip fold mirror 130, the double bounce fold mirror 140, the tertiary mirror 150, the first single bounce fold mirror 160, the beamsplitter 170, and the visible light imaging system VL. The aft portion 251 of the optical bench 250 generally supports the infrared field group 185, the second single bounce fold mirror 190, and the remainder of the infrared light imaging system IL.

FIG. 7B shows a side cross-sectional view further illustrating the telescopic system, panning configuration, within the aircraft superstructure 300. Best shown in this view is the support off the visible light imaging system VL off the fore portion 252 of the optical bench 250 by a visible system support structure 272. The infrared light imaging system IL is supported of the aft section 251 of the optical bench 250 by an infrared system support structure 274. Also illustrated in this side cross-sectional view and in the end cross-sectional view of FIG. 7C is the supporting structure for the secondary mirror 120. A cylindrical support structure 275 extends vertically downward from the fore section 252 concentric with the primary mirror 115. Secondary mirror support beams 277 then extend radially inward at a lower end of this cylindrical structure 277 to support the secondary mirror 120.

The preferred embodiment of the telescopic system has a 110 in. focal length for the visible light, F/10.0 relative aperture, and 2.7° linear field of view. The exact spacings, sizes, and curvatures are set forth in Table I.

TABLE I

| COMPONENT | RADIUS (INCHES) | SPACING (INCHES) | | CONIC CONSTANT | CONIC TYPE |
|---|---|---|---|---|---|
| PRIMARY MIRROR | −24.2000 | −8.7836 | REFL | −0.964250 | ELLIPSE |
| SECONDARY MIRROR | −9.0760 | 12.4836 | REFL | −2.72038 | HYPERBOLA |
| STRIP MIRROR | INF. | −3.5000 | REFL | | |
| DOUBLE BOUNCE MIRROR | INF. | 6.5889 | REFL | | |
| TERTIARY MIRROR | −14.5564 | −6.5889 | REFL | −0.0500444 | ELLIPSE |
| DOUBLE BOUNCE MIRROR | INF. | 5.5000 | REFL | | |
| FOLD MIRROR | INF. | −8.0000 | REFL | | |
| FOLD OR BEAM-SPLIT | INF | 5.0000 | REFL or REFR | | |

Figure 8:
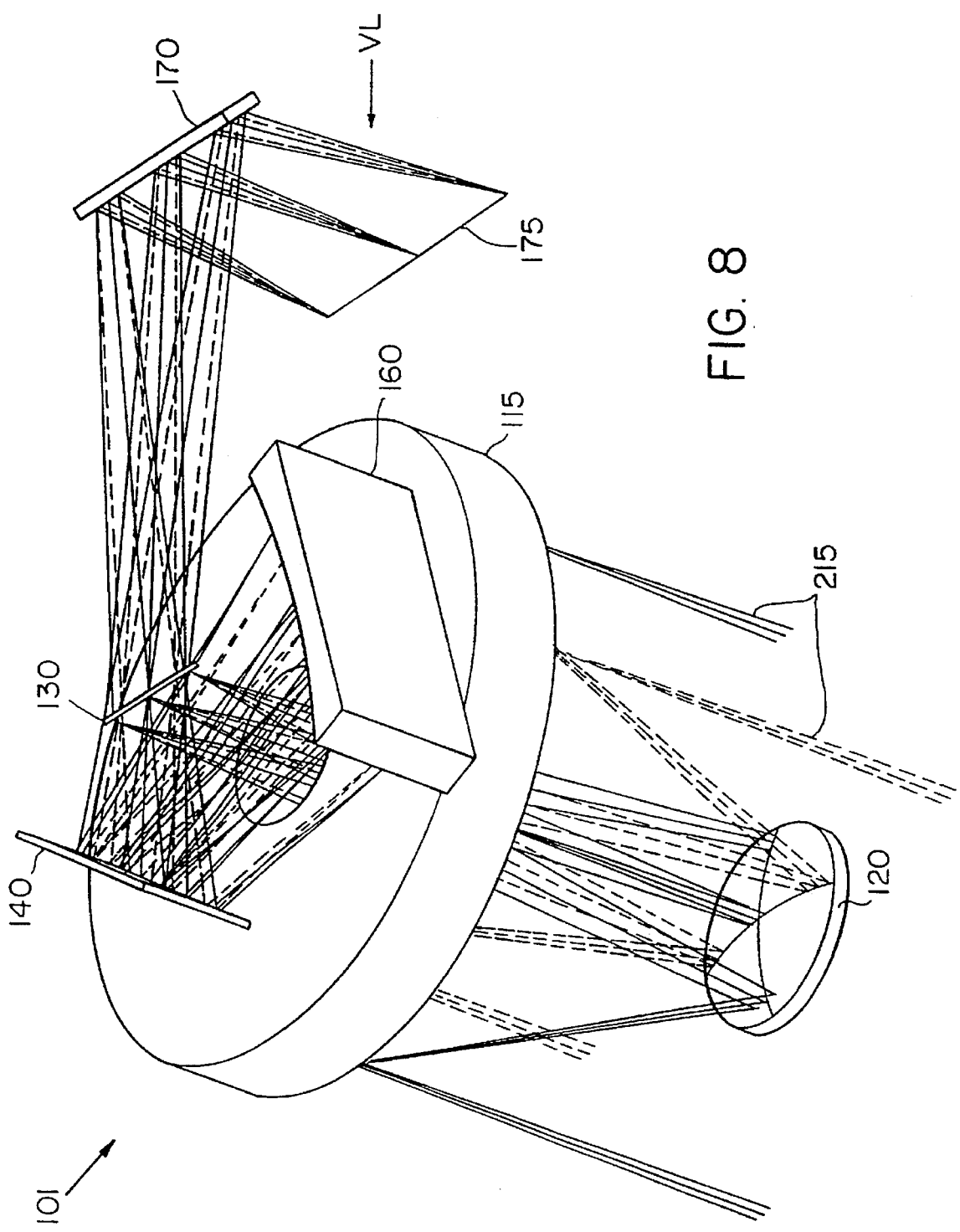
FIG. 8 is a perspective view of a pushbroom configuration of the inventive scanning telescopic system.

At any given moment during its operation, the telescopic system 100, panning configuration, images only a single strip-shaped image that is parallel to its roll axis 210. A complete two dimensional image is formed by then rotating or panning the telescopic system along the roll axis 210. Alternatively, the gimbals of the panning configuration can be dispensed with by using a pushbroom configuration 101 illustrated in FIG. 8. Here, the strip, which is imaged at any given moment, is parallel to the pitch axis or the lateral axis of the system. A complete image is then formed as the plane, or other vehicle housing the telescopic system, travels over the target. The pushbroom configuration 101 is substantially similar to the panning configuration 100 except that since the strip to be imaged is parallel to the pitch axis, the first single bounce fold mirror is not necessary. More specifically, in FIG. 8 the strip fold mirror 130 picks off field angles. The light from the strip fold mirror 130 is then reflected longitudinally directly to the double bounce fold mirror 140, which reflects the light to the tertiary mirror 160. Light reflected by the tertiary mirror 160 again impinges on the double bounce fold mirror 140 and then travels directly down to the beamsplitter 170. The infrared light imaging system is not explicitly shown, but if needed, would be as that used in the panning configuration.

Figure 9:
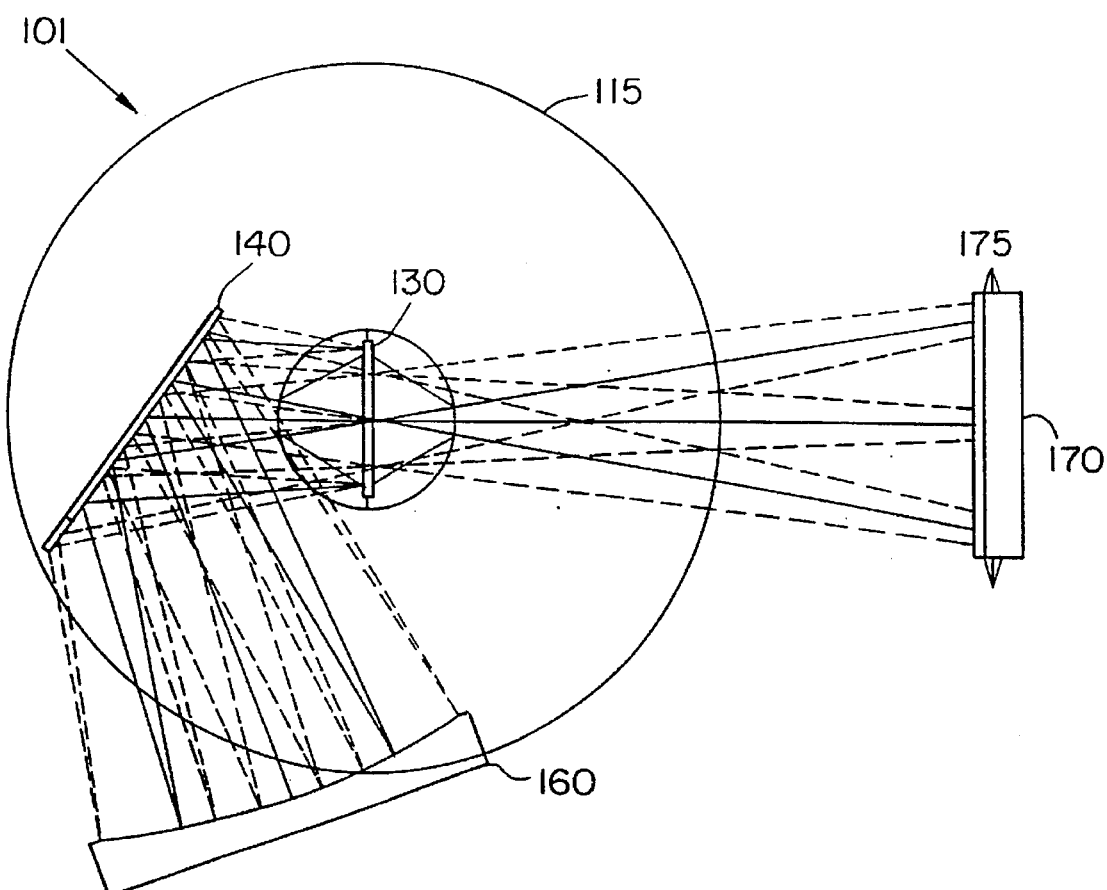
FIG. 9 is a top view of the pushbroom configuration.

FIG. 9 is a top view of the pushbroom configuration showing that other than for the distance between the double bounce fold mirror 140 and the tertiary mirror 160, the light travels longitudinally along system.

The same optical bench can be used for both of the pushbroom and panning configurations since the layout is substantially the same. Simply, the double bounce fold and the tertiary mirror are rotated around the axis of the primary mirror and the single bounce fold must be added for the panning configuration.

Figure 10:
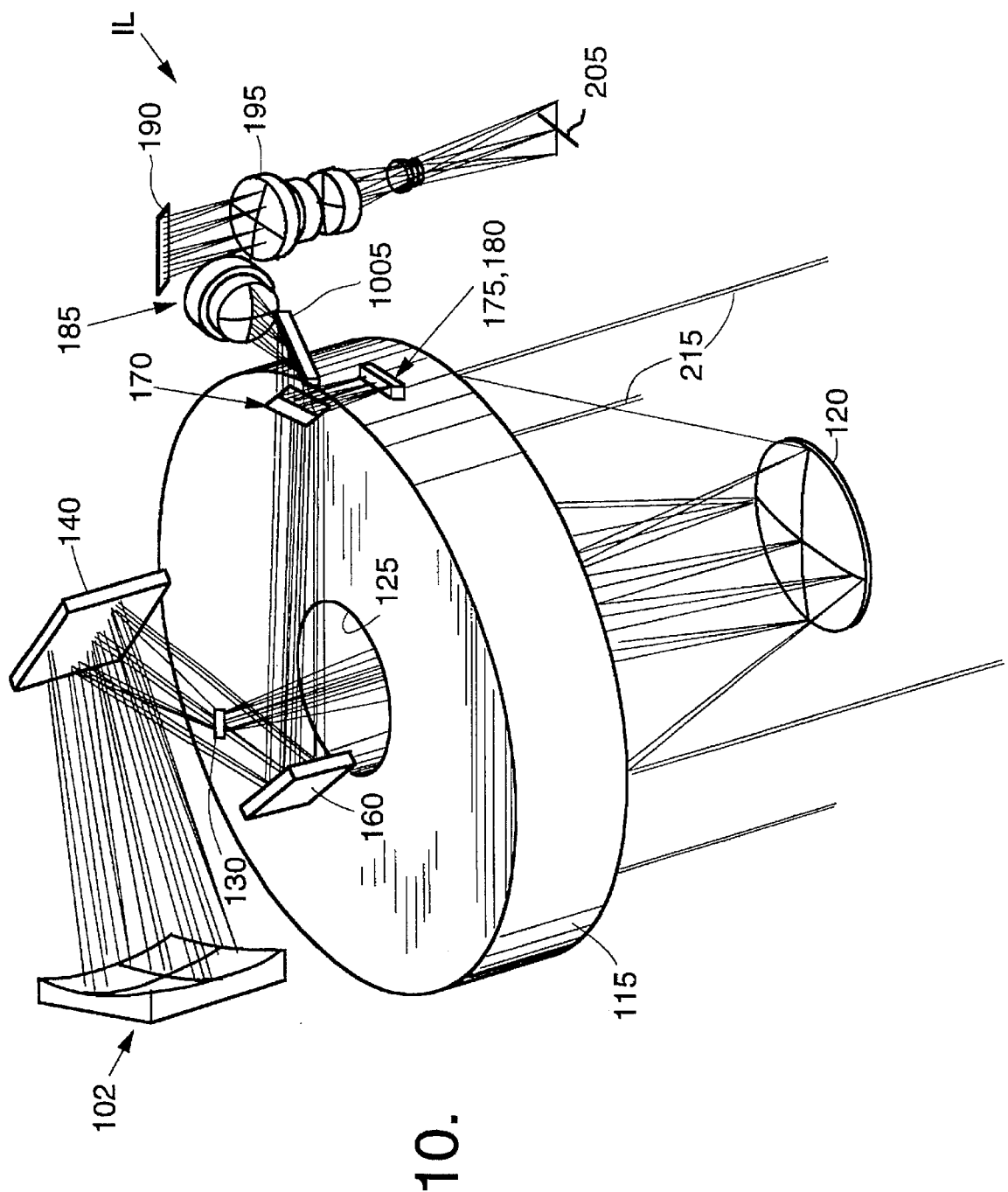
FIG. 10 is a perspective view of another embodiment of the reflective scanning telescopic system, panning configuration.

FIG. 10 shows another embodiment of the panning configuration in which like elements have the same reference numeral. This embodiment further includes a third fold mirror 1005 that enables the length of the system 102 to be shortened by folding the infrared light imaging system IL. It has a 114 in. focal length for the visible light, 0.6° linear field of view, and F/8.0 relative aperture. The exact spacings, sizes, and curvature are give in Table II.

TABLE II

| COMPONENT | RADIUS (INCHES) | SPACING (INCHES) | | CONIC CONSTANT | CONIC TYPE |
| --- | --- | --- | --- | --- | --- |
| PRIMARY MIRROR | −29.1253 | −10.3488 | REFL | −0.953405 | ELLIPSE |
| SECONDARY MIRROR | −11.5756 | 15.6488 | REFL | −2.682493 | HYPERBOLA |
| STRIP MIRROR | INF. | −5.0000 | REFL | | |
| DOUBLE BOUNCE MIRROR | INF. | 8.0000 | REFL | | |
| TERTIARY MIRROR | −17.8983 | −8.0000 | REFL | −0.466641 | ELLIPSE |
| DOUBLE BOUNCE MIRROR | INF. | 8.0000 | REFL | | |
| FOLD MIRROR | INF. | −9.5000 | REFL | | |
| FOLD OR BEAM-SPLIT | INF | 2.5000 | REFL or REFR | | |

The present invention is useful as a scanning telescopic system for scanning terrain over which an aircraft is passing.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A reflective scanning telescopic system, comprising:

a primary curved mirror for collecting incoming light;

a secondary curved mirror for reflecting the light collected by the primary mirror axially through the primary mirror;

a tertiary curved mirror, disposed behind the primary mirror for receiving the light from the secondary curved mirror;

a first fold mirror positioned behind the primary mirror and in front of the secondary mirror to direct light reflected by the secondary mirror towards the tertiary mirror; and a double bounce fold mirror for directing light reflected from the first fold mirror to the tertiary mirror and for reflecting light from the tertiary mirror past the first fold mirror to a light imaging system.

2. A system as claimed in claim 1, wherein the primary mirror has an ellipsoidal curvature, the secondary mirror has an hyperbolic curvature, and the tertiary mirror has an ellipsoidal curvature.

3. A telescopic system as claimed in claim 1, wherein the tertiary mirror flattens a field of light received from the secondary mirror.

4. A telescopic system as claimed in claim 1, wherein the light from the tertiary mirror is imaged on a focal plane without intervening refractive optics.

5. A reflective scanning telescopic system, comprising:

a substantially rigid optical bench pivotable around a roll axis and pivotable around a pitch axis;

a primary curved mirror, mounted to the optical bench, for collecting incoming light;

a secondary curved mirror, positioned in front of the primary mirror and mounted to the optical bench, for reflecting light from the primary mirror;

a tertiary curved mirror, mounted to the optical bench, for reflecting light from the secondary mirror;

a first fold mirror positioned behind the primary mirror and in front of the secondary mirror to direct light reflected by the secondary mirror towards the tertiary mirror, the first fold mirror being a strip mirror for picking off a field angle of the light from the secondary mirror; and a double bounce fold mirror for directing light reflected from the first fold mirror to the tertiary mirror and for reflecting light from the tertiary mirror past the first fold mirror to a light imaging system.

6. A telescopic system as claimed in claim 5, wherein the light imaging system is attached to the optical bench.

7. A method for imaging light using a telescopic system, comprising:

collecting incoming light with a primary mirror;

reflecting the light from the primary mirror axially through the primary mirror with a secondary mirror;

flattening the field of the light by reflecting the light off of a tertiary mirror; and reflecting the light off of a double bounce fold mirror before and after the light reflects off of the tertiary mirror.

8. A method as claimed in claim 7, further comprising flattening the field of the light from the secondary mirror with the tertiary mirror.

9. A method as claimed in claim 7, further comprising picking off a field angle of the light from the secondary mirror with a strip fold mirror and directing the light toward the double bounce fold mirror.

10. A method as claimed in claim 9, further comprising the double bounce fold mirror reflecting light from the tertiary mirror past the strip fold mirror to a light imaging system.

* * * * *